Jan. 12, 1965   A. D. SMITH   3,165,623
THERMOSTATICALLY CONTROLLED ELECTRIC IRON
Filed April 19, 1963   3 Sheets-Sheet 1
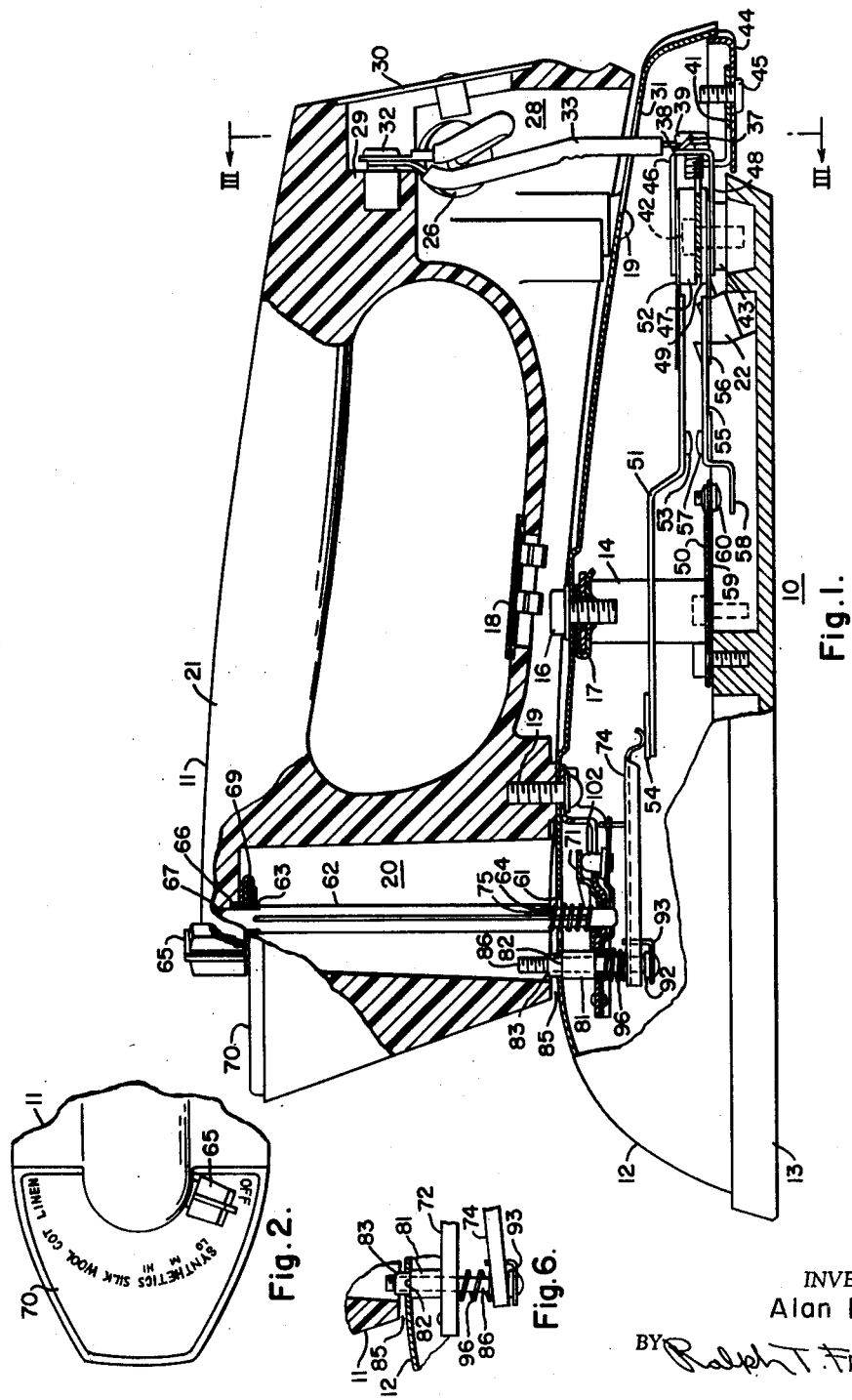
INVENTOR.
Alan D. Smith
BY Ralph T. French
ATTORNEY

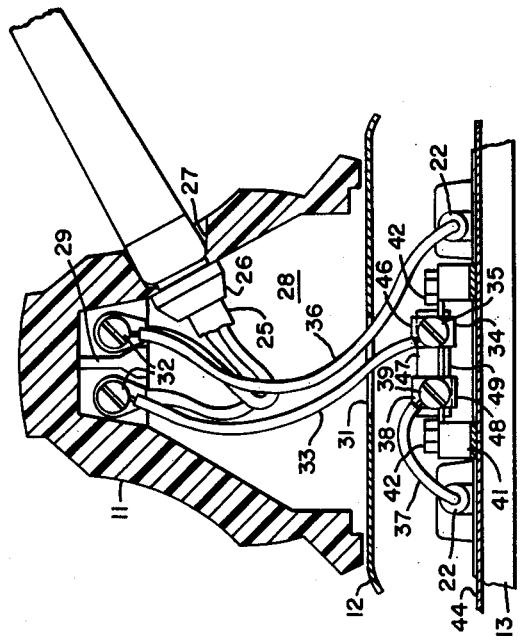

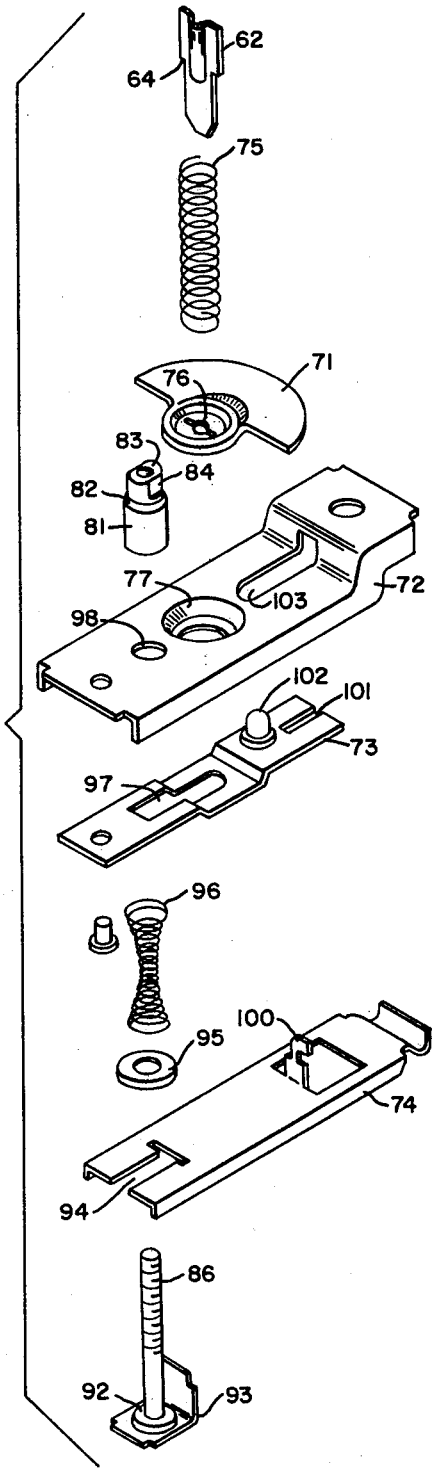

United States Patent Office 3,165,623
Patented Jan. 12, 1965

1

3,165,623
THERMOSTATICALLY CONTROLLED
ELECTRIC IRON
Alan D. Smith, Mansfield, Ohio, assignor to Westinghouse
Electric Corporation, Pittsburgh, Pa., a corporation of
Pennsylvania
Filed Apr. 19, 1963, Ser. No. 274,095
6 Claims. (Cl. 219—252)

This invention relates to electrically heated flatirons and concerns especially regulation of the temperature thereof.

Electrically heated flatirons normally have a resistance heating element in the soleplate and have a thermostat in conjunction therewith to maintain the soleplate at the desired temperature. Selection of any desired temperature within a suitable operating range is accomplished by a manual control knob or the like operatively connected to the thermostat. While the thermostat necessarily is located in the vicinity of the soleplate, the manual control knob preferably is at a readily accessible, cooler location where it can be manipulated by the user of the iron.

Initial setting of the thermostat so that the temperature to which the soleplate is heated corresponds to the desired temperature as indicated by the position of the control knob may be accomplished during or after assembly of the iron, depending upon the construction. Regardless of how the original setting is made, the structural features involved should not place the eventual user of the iron in a position to tamper with the setting. After a period of use it may become desirable to reset the thermostat somewhat, preferably without disassembling the iron or even removing an access plate or the like. However, because of the possibility of damage to the iron or injury to the user, it remains undesirable to facilitate changing of the setting by a housewife or similar user of the iron.

A primary object of the present invention is provision for setting or resetting the thermostat of an electrically heated flatiron without any disassembly thereof.

Another object is the provision of an electrically heated flatiron with inconspicuous means for setting or resetting the thermostat thereof.

A further object is provision of thermostat-setting means characterized by simplicity of construction dependability in operation, and high sensitivity, especially for use in an electrically heated flatiron.

Other objects of this invention, together with means and methods for attaining the various objects, will be apparent from the following description and the accompanying diagrams of a preferred embodiment thereof.

FIGURE 1 is a side elevation, partly in section, of a flatiron embodying this invention;

FIG. 2 is a top plan, somewhat enlarged, of a portion of the apparatus of the preceding view, showing the control knob in the "Off" position;

FIG. 3 is a rear elevation, also partly in section, of another portion of the apparatus shown in the preceding views, taken at III—III of FIG. 1;

FIG. 4 is a side elevation, partly in section, largely of an interior portion of the apparatus of FIG. 1 with the control knob in an "On" position and the interconnected elements shifted somewhat in position from FIG. 1;

FIG. 5 is an exploded view, in perspective, of certain of the interior elements shown previously; and FIG. 6 is a side elevation, partly in section, of certain of the temperature-regulating elements in a further position from those previously shown.

In general, the objects of the present invention are accomplished, in a flatiron having an electrically heated soleplate and a thermostat therefor, by means of an exterior device for adjusting the soleplate temperature; an interior device, accessible from the exterior while the iron is fully assembled, for adjusting the soleplate temperature; and linkage operatively interconnecting the temperature-adjusting devices and the thermostat.

FIG. 1 shows, in side elevation (partly in section) a flatiron 10 embodying this invention. It has a handle 11, a soleplate 13, and an intervening shell 12 generally covering the soleplate but largely broken away in this view to reveal interior elements of the iron. The shell is supported on an inverted U-shaped bracket 14 secured to the soleplate by a pair of cap screws 15 (only one shown, in broken lines) threaded into the soleplate. Securing the shell to the bracket is a screw 16 retained in a suitable aperture through the bight of the U-bracket by clip 17, this screw being normally concealed from the exterior by a snap-in closure plate 18 with integrally formed spring clips fitting into an access aperture in the base portion of the handle. The handle is secured to the shell by a pair of screws 19 threaded upward into the front and rear portions of the handle. A grip portion 21 generally paralleling the base portion joins the front and rear portions of the handle, both of which are partly hollow. The novel elements of this invention are located generally in or near the front handle portion; however, their description will be deferred until completion of the description of the more conventional elements of the flatiron.

The soleplate has passageways (not shown) accommodating an electrical heating element 22, suitably sheathed and insulated; part of one end thereof appears in side elevation in FIG. 1, and both ends in rear elevation in FIG. 3, which shows the interconnecting wiring in some detail. The electrical leads for the heating element originate at a power cord 25, which extends from an external source (not shown) of electrical potential through a grommet 26 fitted in an aperture 27 into a hollow 28 in the right rear portion of the handle. This hollow communicates with the interior of the shell by way of an aperture 31 therein and contains at its upper end a shoulder 29 threaded to receive a pair of terminal screws 32 (only one visible in FIG. 1) at which the respective leads of the cord terminate. An access opening at the upper rear portion of the handle is normally covered by a snap-in closure plate 30, which has spring clips riveted thereto. From the left or near upper terminal screw an electrical lead 33 interconnects to a right lower terminal strip 34 and is secured thereto by a screw 35, while from the other upper terminal screw an electrical lead 36 interconnects to the right or far end of heating element 22 as by being soldered thereto. An electrical lead 37 interconnects the other end of the electrical heating element to a left lower terminal strip 38 and is secured thereto by a screw 39. A bracket 41 secured by a pair of screws 42 to a pair of bosses 43 (one visible in FIG. 1) upstanding from the soleplate is offset downwardly overhanging the rear of the soleplate and extends rearwardly thereof underneath the shell and is normally concealed from view by a bottom closure plate 44 secured to the offset bracket by a screw 45 threaded therein. Right lower terminal strip 34 has a horizontal portion 46 overlying an insulating block 47, and left lower terminal strip 38 has a horizontal portion 48 underlying an insulating strip 49, the insulating block and strip being spaced from one another by (and suitably secured to) the portion of offset bracket 41 located between the supporting bosses.

The thermostat comprises an upper arm 51 and a lower arm 55. The upper arm is connected at one end to horizontal portion 46 of the right lower terminal strip by a flexible strip 52 suitably secured thereto so as to permit the arm to move up and down. Affixed to the underside of this upper arm intermediate its ends is an upper contact 53 of a pair of contacts. The upper arm is offset upwardly and has an insulating piece 54 overlying and affixed to the front end thereof. Lower arm 55 is interconnected at one end by a similar flexible strip 56 to horizontal portion 48 of the left lower terminal strip and has other contact 57 of the pair affixed to it intermediate its ends. This lower arm is offset downwardly below the upwardly offset portion of the upper arm and terminates in short horizontal end portion 58. The thermostatic element itself is a bimetal strip 59 secured at its forward end by a screw to an upstanding boss on the soleplate. The bimetal strip is overlain for most of its length by bridgeing piece 50, which is secured to other bosses on the soleplate by a pair of screws (one indicated in broken lines in FIG. 1). At its free end, the bimetal strip carries a ceramic button 60 retained in a suitable aperture therein at a location overlying short end portion 58 of the lower arm of the thermostat.

FIG. 1 also shows in some detail the temperature-regulating elements of this invention located ahead of the free end (covered by insulating piece 54) of upper arm 51 of the thermostat. FIG. 4, also largely in sectional elevation, shows most of the interior elements thereof in a somewhat different position, corresponding to an operating temperature setting. FIG. 5 shows most of the same interior elements, on an enlarged scale, in an exploded perspective view, reference to which will facilitate an understanding of the showings of FIGS. 1 and 4.

The front portion of handle 11 of the iron contains a hollow 20, which communicates with the interior of shell 12 by way of an aperture 61 therein. Extending vertically through this aperature and the hollow is a rigid control strip 62, which is reduced in width at each end to form a shoulder 63 at the upper end and a shoulder 64 at the lower end. The upper end extends through a slot in the interior end of a control arm 68, the exterior end of which carries a control knob 65. The interior end of the control arm has a shallow dome 66, which fits rotatably in a stepped recess 67 in the interior of the handle at the top of the hollow therein. The control arm extends through a slit in the handle, and the control knob overlies an indicia plate 70, which rests on the extreme forward portion of the handle and also extends through the slit into the hollow. A spring clip 69 between the interior ends of the control arm and the indicia plate helps hold them in place and acts as a bearing to facilitate movement of the control arm to rotate control strip 62, which is keyed to it as indicated, about a vertical axis. Shown (FIG. 2) on the indicia plate are the names of various types of fabrics, located so that proper positioning of the control knob (e.g., at "Silk") will assure the user that the thermostat is set for the proper ironing temperature for that type of fabric. The extreme counterclockwise position of the control knob, which has an angular range of positions of approximately a half circle, is marked "Off" to indicate that the heating element is not energized in that knob position (FIGS. 1 and 2).

Located below the lower end of control strip 62, in the interior of the shell, are four principal elements of the temperature-regulating system: a cam member 71, a support member 72, a follower member 73, and a lever member or presser arm 74. These and the related parts appear in greatest detail in the exploded view, FIG. 5. The lower end of control strip 62 has compression spring 75 surrounding it, the upper end of the spring resting against shoulder 64 of the control strip and the lower end resting in the depressed central portion of the cam member, which contains a slot 76. The lower end of control spring 62 rests in depression 77 in the support member after passing through slot 76 in the correspondingly depressed central portion of the cam member. The support member is secured in place by one of screws 19, threaded upward into the handle, which also secure shell 12 thereto. The other end of the support member is spaced from the inside surface of the shell by a bushing 81, upper end 83 of which is reduced in diameter forming a shoulder 82 thereon. The shoulder of the bushing bears against the inside surface of the shell, and the reduced upper end passes through a suitable aperture in the shell and terminates in hollow 20 in the handle. The handle is spaced slightly from the outer surface of the shell to provide a gap 85 at the front and sides in the vicinity of the upper end of the bushing, and a pair of flats 84 on opposing sides of reduced end 83 of the bushing are accessible through the gap. The bushing is threaded internally and receives a screw 86 therein, from below.

Screw 86 has a washer 92 affixed thereto holding an angle bracket 93 in place against the screw head. The screw then passes, in this order, through the base of a T-shaped slot 94 in an end of lever member 74, a washer 95 overlying the slot, a compression spring 96, a longitudinal slot 97 in follower member 73, an aperture 98 in support 72, and into the bushing. The forward ends of the support and follower members are fastened together, as by riveting. The follower member, which is flexible, has a slot 101 extending longitudinally a short distance inward from the rear end. An upstanding hooked portion 100 of the lever member engages slidably in this slot. Near the inner end of the slot is a cam follower 102 extending upward from the follower member through an internal longitudinal slot 103 in the support member and into contact with the underside of cam member 71.

The operation of the apparatus of this invention is readily understood. Clockwise movement of the readily manipulatable control knob rotates the cam member to depress the cam follower on its flexible member and thereby depress the rear end of the lever member, the front end of which is supported pivotally on the angle bracket. As the rear end of the lever member depresses the front end of the upper switch arm of the thremostat by contact with the insulating piece carried thereon, the spacing between the switch contacts is reduced. The circuit to the heating element closes when the contacts come together, as shown in FIG. 4, whereupon the soleplate temperature rises. The bimetal strip flexes or curves as the temperature increases, as shown in broken lines in FIG. 4, lowering the ceramic button into contact with the free end of the lower arm of the thermostat to separate the switch contacts by downward movement of the lower arm. As the soleplate cools while the circuit to the heating element is broken the bimetal strip begins to straighten again, and when the temperature falls sufficiently the switch contacts close again to maintain the temperature within a desirably narrow range about an equilibrium temperature. Any further change in the positioning of the control knob will vary the equilibrium temperature. When the knob is at the "Off" position (corresponding to FIG. 1) the cam follower will be located at the highest position on the cam surface, ensuring an open circuit to the heating element by excessive spacing of the switch contacts at all normal room temperatures.

According to this invention, movement of the control knob is not the only readily available method of varying the spacing of the switch contacts. Rotation of the internally threaded bushing moves the screw therethrough, raising or lowering the angle bracket affixed to the screw head and thereby raising or lowering the forward end of the lever member pivoted thereon. A rising of the screw as it threads further through the bushing depresses the rear end of the lever member, which pivots in such instance about the point of engagement of the hook (carried intermediate its ends) with the slot in the flexible follower member, which is fixed in position so long as the cam itself does not rotate. The compression spring about the screw between the forward end of the lever member and the overlying members ensures contact of the cam follower against the cam at all times. Reverse rotation of the bushing has the opposite effect of withdrawing the screw gradually and increasing the spacing of the switch contacts. Shown in FIG. 6 is a withdrawn position of the screw, such as would be appropriate if the operating temperature at a setting such as previously shown had been too high.

The bushing may be rotated to vary the screw position and, therefore, the setting of the thermostat by inserting a thin wrench or the like through the gap left between the handle and the shell of the iron at the front so as to engage the flats present on opposite sides of the upper end of the bushing. The gap itself is inconspicuous, and the bushing is barely visible therein. Accordingly, the housewife or other user of the iron is most unlikely to realize that the thermostat setting can be altered as just described. The advantage for an appliance serviceman of being able to reset the thermostat as desired without disassembling the iron to any extent (not even having to open or remove an access or cover plate) is obvious. The invention also permits a final setting to the thermostat at the factory after completion of assembly and inspection. The actual location of the gap and structure of the temperature-regulating mechanism may be varied without departing from the invention, which is defined in the following claims.

The claimed invention:

1. A flatiron having an electrically heated soleplate and a thermostat therefor, a shell covering the soleplate and thermostat, regulating the temperature of the soleplate, said means comprising; an exterior control knob, a cam actuated by the control knob, a cam follower actuated by the cam, linkage interconnecting the cam follower to the thermostat and including a presser arm, a support for the presser arm, and means accessible from the exterior for varying the location of the support for the presser arm in the direction of movement of the cam follower and thereby adjusting the thermostat, the support for the presser arm including a screw adjustable in the direction of movement of the cam follower and including also an element affixed to the screw and adapted to carry the presser arm pivotally thereon.

2. The apparatus of claim 1 wherein the screw has a bushing threaded thereon having a portion thereof accessible from the exterior and adapted to accommodate a wrench or the like for adjustment lengthwise of the screw, one end of the bushing bearing against a fixed portion of the iron and thereby determining the location of the screw in the direction of movement of the cam follower, and the opposite end of the bushing bearing against a support for the cam, the cam support having an opening adapted to receive the screw free of engagement therewith.

3. Flatiron comprising a soleplate having an electrical heating element, a thermostat including a pair of switch contacts adapted to be opened and closed in series circuit from a source of electrical potential to the heating element, a control knob, a cam, a support for the cam, an interconnecting strip for transmitting movement of the knob to move the cam, a cam follower, linkage including a pivotally mounted presser arm for transmitting movement of the cam follower to the thermostat so as to vary the contact spacing, support means mounting the presser arm for pivoting in the direction of movement of the cam follower and including a screw adjustable in that direction, a bushing threaded on the screw and bearing at one end against a fixed portion of the iron and at the opposite end against the cam support, and a support element carried on the screw and engaging the presser arm pivotally, whereby rotative adjustment of the bushing varies the location of the screw longitudinally thereof and thereby pivots the presser arm.

4. The apparatus of claim 3 wherein the cam follower is mounted on a flexible leaf affixed at one end to the cam support near the screw and interengaged at the opposite end with a portion of the presser arm remote from the pivotal support therefor.

5. The apparatus of claim 4 wherein the screw has a spring surrounding a portion thereof and bearing at one end against a portion of the presser arm located on the opposite side of the support element from the portion thereof interengaged with the flexible leaf, and bearing at the opposite end against the flexible leaf at a location thereon between affixation thereof to the cam support and the portion thereof mounting the cam follower.

6. Flatiron comprising a soleplate, an electrical heating element embedded in the soleplate, a thermostat carried on the soleplate and including a pair of switch contacts adapted to be opened and closed in series circuit with a source of electrical potential, the respective contacts being mounted on respective arms, one of which is movable to vary the contact spacing and is position-dependent upon the soleplate temperature, and the other of which is also movable to vary the contact spacing, temperature-adjusting means effective to control the position of that other movable arm, a shell affixed to the soleplate and covering the soleplate and thermostat, a handle supported by the soleplate outside the shell, the temperature-adjusting means including a control knob and an indicia plate supported on the handle and extending exteriorly thereof, a control arm affixed to the control knob, the handle having a slot therein to receive the control arm and the indicia plate and having a hollow therein terminating at an internal recess adjacent the slot, the control arm and indicia plate conforming in contour to the recess, the shell having an aperture therein communicating with the hollow in the handle, a control strip keyed at one end to the control arm and terminating at the opposite end inside the shell after passing through the aperture therein, a cam keyed to that opposite end of the control strip, a support for the cam affixed adjacent the interior surface of the shell, the cam support and the cam being contoured alike in the vicinity of the control strip, the control strip including means in the vicinity of the cam for retaining the end of a spring, a compression spring retained between the cam and the retaining means of the control strip and biasing the cam against the cam support, a bushing having one end extending through the shell and bearing against an interior surface of the handle adjacent the hollow therein and bearing at the opposite end against the cam support, being supported rotatively therebetween, a screw threaded through the bushing, a flexible leaf affixed at one end to the cam support and carrying a cam follower intermediate its ends in juxtaposition to the cam, a presser arm interengaged intermediate its ends with the opposite end of the leaf, a support element affixed to the screw and mounting the presser arm for pivoting movement in the direction of movement of the cam follower, a compression spring located about the screw between the leaf and the end of the presser arm on the opposite side of the support element from the portion thereof interengaged with the leaf, the opposite end of the presser arm bearing against that other contact arm, the handle and shell having a gap therebetween in the vicinity of the bushing for access thereto, whereby rotative adjustment of the bushing will vary the position of that contact arm independently of the control knob and thereby regulate the thermostat.

References Cited in the file of this patent

UNITED STATES PATENTS

| 2,012,490 | Wright | Aug. 27, 1935 |
| 2,602,248 | Finlayson | July 8, 1952 |
| 2,674,133 | Ireland | Apr. 6, 1954 |
| 3,030,485 | Jepson et al. | Apr. 17, 1962 |

FOREIGN PATENTS

| 586,543 | Great Britain | Mar. 21, 1947 |